Oct. 13, 1931.  G. D. JONES  1,827,237
PUSHED AGRICULTURAL IMPLEMENT
Filed Dec. 28, 1927
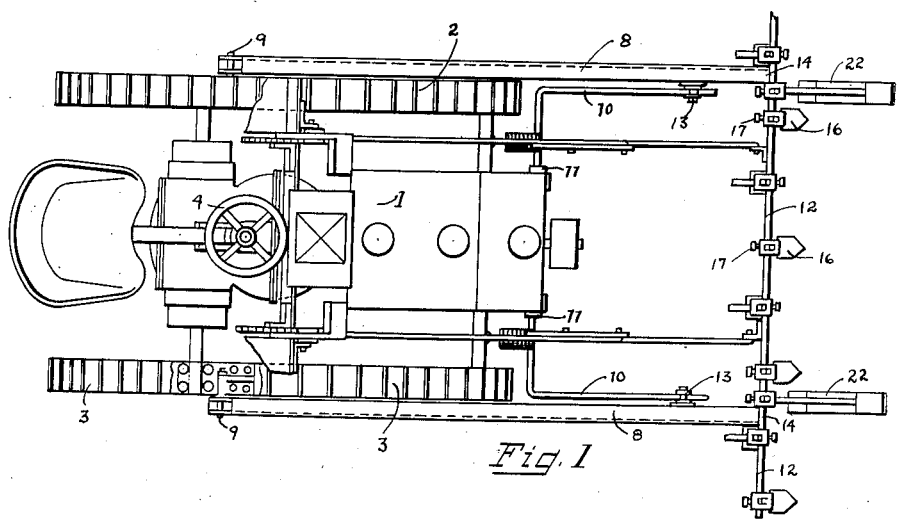
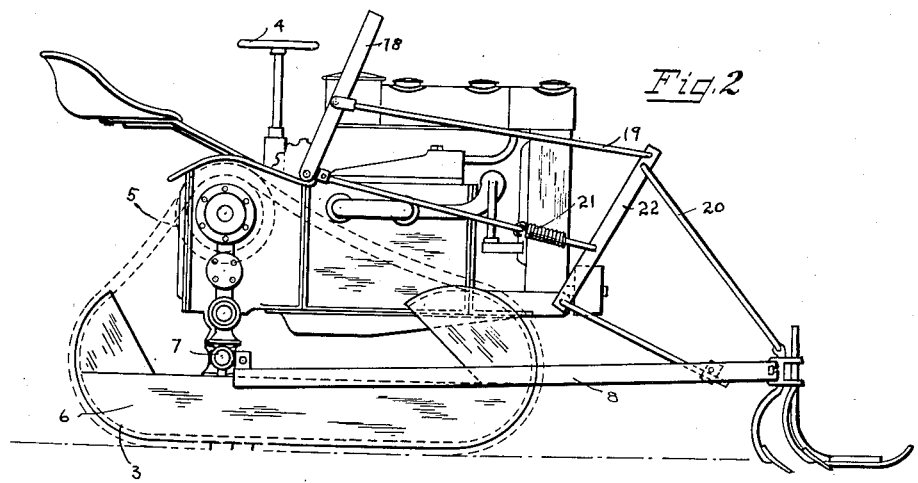
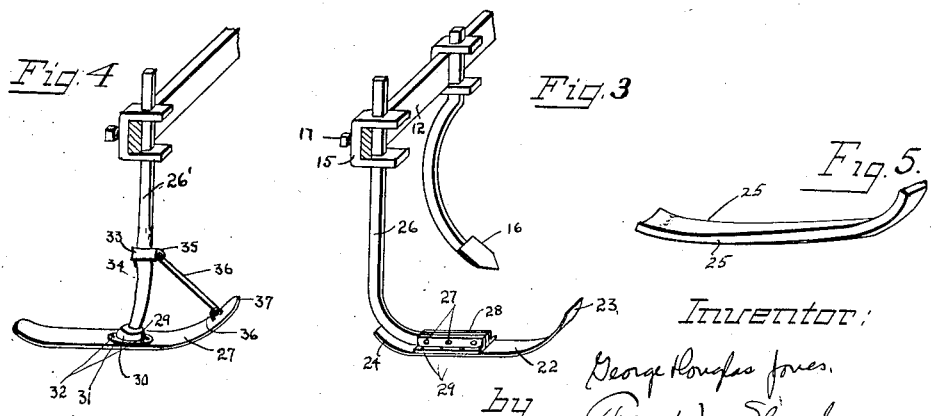

Patented Oct. 13, 1931

1,827,237

UNITED STATES PATENT OFFICE

GEORGE DOUGLAS JONES, OF CLEVELAND, OHIO, ASSIGNOR TO THE CLEVELAND TRACTOR COMPANY, OF CLEVELAND, OHIO, A CORPORATION OF OHIO

PUSHED AGRICULTURAL IMPLEMENT

Application filed December 28, 1927. Serial No. 243,053.

This invention relates to an agricultural tillage implement which is adapted to be attached to and pushed in advance of a power tractor.

One of the objects of my invention resides in the provision of a suitable support for the implement whereby the depth of earth operated upon will be suitably regulated during tillage operations.

Another object of my invention is to provide a suitable support for tillage implements adapted to be pushed by a tractor, and which will perform the functions heretofore less efficiently performed by a supporting caster for the implement and which will not unduly oppose the lateral swinging of the implement responsive to turning movements of the tractor.

Another object of my invention is to provide a support for pushed tillage implements which will not interfere with intensive tillage of the soil laterally closely adjacent the support and yet which will permit a compactness of tillage mechanism with a maximum of ground engaging area, for supporting the implement, and regulating the depth of tillage, as may be required in tillage of soil having various qualities.

Other objects of my invention and the invention itself will become apparent by reference to the following description of certain embodiments of my invention and in which description reference will be had to the accompanying drawings illustrating the said embodiments.

Referring now to the drawings:

Fig. 1 shows a plan view of a combined tractor and tillage implement embodying my invention;

Fig. 2 is an elevational view of the embodiment of Fig. 1;

Fig. 3 is a view of a fragment of tillage implement of the type illustrated in the foregoing figures, the view being in perspective;

Fig. 4 is a similar view of a modified form of my invention; and

Fig. 5 shows a modified form of skid which may sometimes be employed, the view being in perspective.

Referring now to the different figures of drawings in all of which like parts are designated by like reference characters, at 1, I show generally a tractor which herein is shown as being of the track laying type having a pair of tracks 2 and 3 which may be variably and differentially driven so as to accomplish forward and rearward traveling and turning movements of the tractor in the well known manner. The tractor is provided with a hand wheel 4 whereby, through the operation of clutches or the like, the operator may control the driving of the two tracks which are driven through sprockets 5. Each of the tracks encircle tractor track frames 6 swivelably secured at 7 to the tractor frame in order to permit vertical rocking thereof relative to the main frame. A pair of spaced implement push rods 8 are journalled at 9 to the tractor adjacent the swiveling axis 7 of the track frames and adjacent the rear of the tractor.

A pair of vertically swivelable arms 10, journaled in a journal 11, disposed in a forward portion of the tractor frame 1, extend longitudinally forwardly of the tractor toward the implement frame 12, and along the push rods 8, being disposed inwardly thereof. The pushed rods are provided with inwardly extending projections 13 through which arms 10 loosely project. The arms 10 prevent lateral displacement of the rods 8, although permitting vertical swivelling movements thereof. The transverse implement frame 12 is rigidly secured at the ends 14 of the rods 8, and is adapted to move up and down according to the terrain and responsive to the swivelling of the arms 8 and the tractor frame.

Upon the implement beam 12 there is secured at intervals by U-shaped clips 15, a plurality of depending tillage tools 16, herein illustrated as being arcuate in form and projecting obliquely forwardly and downwardly at a "spading" angle. Set screws 17, passing through the intermediate portion of the clips, rigidly hold the tool 16 to the frame 12. A mechanism comprising a hand lever 18 and links 19 and 20 and lever 22 is provided for the purpose of controlling the elevation of the implement, as for instance, when traveling or cultivating.

A spring 21 is interposed between the lever 22 and the frame to counterbalance for the weight of the implement and push rods therefor. Closely adjacent one or more of the tools 16 and preferably near the lateral ends of the frame 12, I provide a pair of skids 22, which in the embodiment of Figs. 1 to 3, inclusive, are illustrated as being two in number and disposed toward the laterally extending ends of the frame 12, so as to keep the frame 12 substantially parallel with the ground being traversed. The skids 22 are elongated and have upturned forward and rearward ends 23 and 24, respectively, the forward end being preferably more upturned than the rearward end 24, and sometimes, as illustrated in Fig. 5, in addition I upturn the lateral portions 25 of the skid.

The skids of Figs. 1, 2, 3 and 5 are adapted to be on a substantially L-shaped arm 26 which is secured by a clip 15 and set screw 17, the same as are the tools 16. Any number of skids may be provided, although two will usually suffice, and the position of the skids and of the tools may be altered by loosening the set screws and sliding the arms 26 or 16 of the skid or tool, as the case may be, along the implement frame 12. The implement frame 12 is preferably wider in vertical dimension than its transverse thickness, so as to resist turning movements imparted by the tools during tillage operations.

The skids 22 are secured on the horizontal portion of the arms 26 in any desired manner, such as by a plurality of rivets 27 projected through a pair of clamping brackets 28 which in turn are secured to the upper surface of the skid as by rivets 29. These brackets are preferably L-shaped in cross-section, the two arms being preferably of the same length so that they are interchangeable.

Referring now to Fig. 4, a swivelling connection is illustrated between the skid arm 26' and the skid. This, in the embodiment illustrated, taking the form of a universal joint of a well known type, wherein the arm 26' terminates in a bolt 29 or a parti-spherical portion thereof projected within a retaining annular cap 30 provided with a flange 31 which may be riveted as illustrated at 32 to the skid. The skid in such a case is preferably upturned in its forward portion, but need not be upturned in its rearward portion and the swivelable universal joint 28 is preferably placed nearest the forward end, so that a caster-like action of the skid may be had. Such a skid is generally in the form of a ski.

A swivelable collar 33 is mounted over the lower round portion of the arm 26' and above the shoulder 34 formed therein, such collar being rotatable on the arm. The collar terminates at one side in an apertured lug 35 and a chain or other link 36 is passed through the opening thereof and at its other end is secured to an eyelet 36 secured on the forward upturned surface of the skid. Such a link prevents undue swivelling in one direction tending to push the nose 37 of the skid into the ground when operating on a very uneven terrain.

Having thus described my invention in certain improvements, I am aware that numerous and extensive departures may be made from the embodiments herein illustrated and described without departing from the spirit of my invention.

I claim:

1. In an implement adapted to be pushed ahead of a power tractor and adapted to be bodily swung responsive to turning movements thereof, a transverse implement frame beam, a tillage implement secured thereto and projecting downwardly therefrom and a support for said frame beam secured thereto, comprising a leg and a longitudinally extending relatively narrow elongated skid having an upturned forward end adapted to rest upon and space the beam from the ground, said skid being vertically swivelable on said leg.

2. In an implement adapted to be pushed ahead of a power tractor and adapted to be bodily swung responsive to turning movements thereof, a transverse implement frame beam, a plurality of tillage tools secured to the beam and projecting downwardly therefrom and a pair of supports for said frame secured to the beam, each comprising a leg and a longitudinally extending relatively narrow elongated skid having an upturned forward end adapted to rest upon and space the beam from the ground, said skids being vertically swivelable and disposed at either side of said plurality of tools, and means to restrain downward tilting of the forward end of the skid.

3. An implement adapted to be pushed ahead of a tractor comprising a frame composed of parallel push rods and a transversely extending beam secured rigidly to adjacent ends of said rods, said rods being adapted to be pivotally attached to the tractor in vertical rocking relation; implements rigidly attached to and depending from said beam; and vertically and laterally adjustable ground engaging frame supporting means depending from adjacent ends of said beam.

4. An implement adapted to be pushed ahead of a tractor comprising a frame composed of parallel push rods and a transversely extending beam secured rigidly to adjacent ends of the rods, said rods being adapted to be pivotally attached to the tractor in vertical rocking relation; implements rigidly attached to and depending from said beam; and ground engaging frame supporting means depending from and attached to adjacent ends of the beam, said implements and said ground engaging means being individually adjustable both laterally and vertically relative to said beam.

5. An implement adapted to be pushed ahead of a tractor comprising a rigid frame having a transversely extending forward beam, implements rigidly attached to said beam, said implements being individually adjustable both vertically and laterally, and ground engaging means depending from said beam.

6. An implement adapted to be pushed ahead of a tractor comprising a rigid frame, and supporting members for the frame including depending arms rigidly attached to the frame and a ground runner pivotally attached to each of said arms.

7. An implement adapted to be pushed ahead of a tractor comprising a frame, and a supporting member for the frame including a rigid depending arm, a ground engaging runner, and a universal joint connection between said arm and said runner.

8. In a tractor mechanism, in combination with a tractor, an implement disposed forwardly of the tractor and adapted to be pushed thereby comprising a frame, a vertically adjustable ground engaging support depending from the frame, a vertically adjustable earth-working tool depending from the frame, and adjustable securing means fixing the tool to the frame in desired vertical adjusted position.

9. In a tractor mechanism, in combination with a tractor, an implement disposed forwardly of the tractor and adapted to be pushed thereby comprising an implement frame, an earth working blade, a blade support rigidly attached to the frame, said blade and support depending from said frame, and securing means between the support and frame adapted to permit vertical adjustment of the blade carrying support, said frame having a rearward extension making vertical swivelable connection with a rear portion of the tractor, said tractor comprising a pair of laterally disposed wheels adapted to be variably operated relative to each other to steer the tractor.

In testimony whereof I hereunto affix my signature this 23rd day of December, 1927.

GEORGE DOUGLAS JONES.